(12) United States Patent
Seipp

(10) Patent No.: US 11,902,040 B1
(45) Date of Patent: Feb. 13, 2024

(54) PRIVATE COMMUNICATION IN A TELECONFERENCE

(71) Applicant: Google LLC, Mountain View, CA (US)

(72) Inventor: Karsten Seipp, Bexhill (GB)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/896,839

(22) Filed: Aug. 26, 2022

(51) Int. Cl.
H04L 12/18 (2006.01)

(52) U.S. Cl.
CPC ...... H04L 12/1827 (2013.01); H04L 12/1822 (2013.01); H04L 12/1895 (2013.01)

(58) Field of Classification Search
CPC ............. H04L 12/1827; H04L 12/1822; H04L 12/1895
See application file for complete search history.

(56) References Cited

U.S. PATENT DOCUMENTS

| | | | |
|---|---|---|---|
| 7,653,013 B1 * | 1/2010 | Moran | H04L 12/1822 370/260 |
| 11,343,293 B1 * | 5/2022 | Slotznick | H04N 5/272 |
| 2012/0128146 A1 * | 5/2012 | Boss | H04M 3/564 379/202.01 |
| 2012/0166534 A1 * | 6/2012 | Bentley | H04L 12/1822 709/204 |
| 2013/0227437 A1 * | 8/2013 | Brody | H04L 12/1822 715/757 |
| 2015/0103136 A1 * | 4/2015 | Anderson | H04N 7/155 348/14.09 |

(Continued)

FOREIGN PATENT DOCUMENTS

WO    WO 1999/048011    9/1999

OTHER PUBLICATIONS

MDN, "Web_Audio_API", last modified Sep. 5, 2022, https://developer.mozilla.org/en-US/docs/Web/API/Web Audio API, retrieved on Sep. 9, 2022, 10 pages.

(Continued)

*Primary Examiner* — John A Follansbee
*Assistant Examiner* — Raqiul A Choudhury
(74) *Attorney, Agent, or Firm* — Dority & Manning, P.A.

(57) ABSTRACT

The present disclosure is directed to a computer-implemented method for enabling private communications during a videoconference. The method includes receiving interface data associated with input from a first participant to a first participant device associated with the first participant and participating in the videoconference. The interface data includes requesting limiting transmission of communication data to a second participant device associated with a second participant and participating in the videoconference while excluding transmission of the communication data to third participant device(s) participating in the videoconference. The method includes obtaining the communication data associated with the first participant including audio data associated with the first participant. The method includes causing transmission of the communication data associated with the first participant to the second participant device for surfacing of the communication data on the second participant device but not the third participant device(s) participating in the videoconference.

18 Claims, 5 Drawing Sheets

(56) References Cited

U.S. PATENT DOCUMENTS

2022/0394067 A1\* 12/2022 Mathihalli .......... H04L 65/1069
2023/0007063 A1\* 1/2023 Gupta ................ H04L 65/1069

OTHER PUBLICATIONS

WebRTC, "Real-time communication for the Web", https://webrtc.org/, retrieved on Sep. 8, 2022, 2 pages.
International Search Report and Written Opinion for Application No. PCT/US2023/023099, dated Oct. 11, 2023, 11 pages.

\* cited by examiner

500

502 — RECEIVING INTERFACE DATA ASSOCIATED WITH INPUT FROM A FIRST USER TO A FIRST CLIENT DEVICE ASSOCIATED WITH THE FIRST USER AND PARTICIPATING IN THE VIDEOCONFERENCE, WHEREIN THE INTERFACE DATA COMPRISES A REQUEST TO LIMIT TRANSMISSION OF COMMUNICATION DATA TO A SECOND CLIENT DEVICE ASSOCIATED WITH A SECOND USER AND PARTICIPATING IN THE VIDEOCONFERENCE WHILE EXCLUDING TRANSMISSION OF THE COMMUNICATION DATA TO ONE OR MORE THIRD CLIENT DEVICES PARTICIPATING IN THE VIDEOCONFERENCE

504 — OBTAINING THE COMMUNICATION DATA ASSOCIATED WITH THE FIRST USER, WHEREIN THE COMMUNICATION DATA COMPRISES AUDIO DATA ASSOCIATED WITH THE FIRST USER

506 — CAUSING TRANSMISSION OF THE COMMUNICATION DATA ASSOCIATED WITH THE FIRST USER TO THE SECOND CLIENT DEVICE ASSOCIATED WITH THE SECOND USER FOR SURFACING OF THE COMMUNICATION DATA ON THE SECOND CLIENT DEVICE ASSOCIATED WITH THE SECOND USER BUT NOT THE ONE OR MORE THIRD CLIENT DEVICES PARTICIPATING IN THE VIDEOCONFERENCE

PRIVATE COMMUNICATION IN A TELECONFERENCE

FIELD

The present disclosure relates generally to multi-participant teleconferencing systems. More particularly, the present disclosure relates to improved features relating to facilitating private communication within a teleconference.

BACKGROUND

Multi-participant teleconferencing can include multi-participant video conferences which can provide video streams to a participant device for multiple participants of a videoconference. Along with the video streams for multiple participants of the videoconference, the conferencing system can also provide audio streams associated with the live audio of a participant to multiple participants of the videoconference (e.g., as captured by microphone(s) included in or connected to the participant's participant device).

While providing audio streams can be helpful to foster discourse within a videoconference, it can also be difficult to conduct a private conversation, for example, to ask clarifying questions to other participants of the videoconference without interrupting the entire conference. As an example, a participant may need to completely halt an ongoing presentation in a videoconference to ask a quick question which another participant can easily answer without interrupting the flow of the videoconference.

Certain current video conferencing techniques enable participants to control a chat function personally and manually to privately chat with another person in a videoconference. For example, a participant may navigate to another interface to find a separate chat function.

While such a manual mute feature can be an effective measure to conduct private conversations, it comes with a lot of frustrations: participants may be unaware that they are in a chat associated with the videoconference and thus broadcasting their private conversation to all participants of the videoconference. Alternatively, it may be cumbersome to navigate through several windows to find a separate chat function in order to conduct a quick private conversation with another participant of the videoconference. Additionally, addressees of the message may not always be aware that they have received it, especially if this is in a different application or part of the interface.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for enabling private communications during a videoconference comprising three or more participating devices. The method includes receiving interface data associated with input from a first participant to a first participant device associated with the first participant and participating in the videoconference. In particular, the interface data includes a request to limit transmission of communication data to a second participant device associated with a second participant and participating in the videoconference while excluding transmission of the communication data to one or more third participant devices participating in the videoconference. The method includes obtaining the communication data associated with the first participant. In particular, the communication data includes audio data associated with the first participant. The method includes causing transmission of the communication data associated with the first participant to the second participant device associated with the second participant for surfacing of the communication data on the second participant device associated with the second participant but not the one or more third participant devices participating in the videoconference.

Another example aspect of the present disclosure is directed to a computing system including one or more processors and one or more non-transitory, computer-readable media that store instructions that, when executed by the one or more processors, cause the computing system to perform operations. The operations include receiving interface data associated with input from a first participant to a first participant device associated with the first participant and participating in the videoconference. In particular, the interface data includes a request to limit transmission of communication data to a second participant device associated with a second participant and participating in the videoconference while excluding transmission of the communication data to one or more third participant devices participating in the videoconference. The operations include obtaining the communication data associated with the first participant. In particular, the communication data includes audio data associated with the first participant. The operations include causing transmission of the communication data associated with the first participant to the second participant device associated with the second participant for surfacing of the communication data on the second participant device associated with the second participant but not the one or more third participant devices participating in the videoconference.

Another example aspect of the present disclosure is directed to one or more non-transitory computer-readable media that store instructions that, when executed by one or more processors of a computing system, cause the computing system to perform operations. The operations include receiving interface data associated with input from a first participant to a first participant device associated with the first participant and participating in the videoconference. In particular, the interface data includes a request to limit transmission of communication data to a second participant device associated with a second participant and participating in the videoconference while excluding transmission of the communication data to one or more third participant devices participating in the videoconference. Even more particularly, the interface data includes data responsive to the first participant touching or clicking on an icon surfaced in the videoconference wherein the icon is associated with the second participant. The operations include obtaining the communication data associated with the first participant. In particular, the communication data includes audio data associated with the first participant. The operations include causing transmission of notification data to the participant device associated with the second participant. In particular, the notification data is associated with surfacing a notification, wherein the notification is directed to indicate to the second participant that private communication from the first participant has been obtained. Even more particularly, the notification data includes data directed to a participant input interface including selectable interface elements directed to whether the second participant accepts or rejects the communication data. The operations include causing transmission of videoconference parameter data. In particular, the videoconference parameter data is directed to adjusting a volume of the videoconference audio data. The operations include causing the transmission of the notification data to the participant device associated with the second participant further including obtaining response data associated with data from the participant device associated with the second participant. In particular, the data is indicative of the second participant accepting the private communication from the first participant. Even more particularly, causing the transmission of the communication data associated with the first participant to the second participant device includes, in response to obtaining the response data, causing transmission of the communication data associated with the first participant to the second participant device for surfacing of the communication data on the second participant device but not the one or more third participant devices participating in the videoconference.

Other aspects of the present disclosure are directed to various methods, non-transitory computer-readable media, participant interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 5 depicts a flow diagram for providing a multi-participant teleconference according to example embodiments of the present disclosure.

Figure 1:
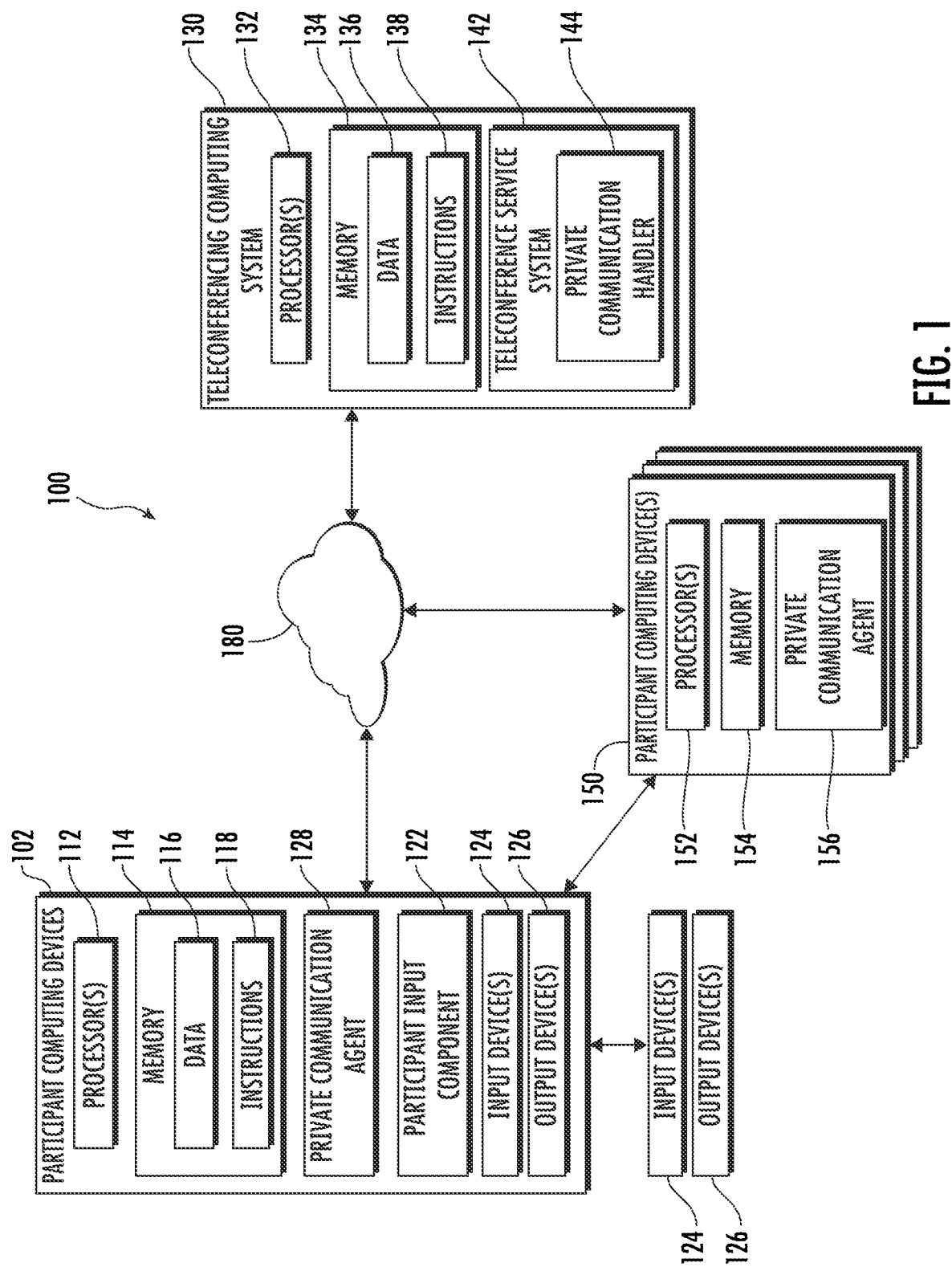
FIG. 1 depicts a block diagram of an example computing system 100 that performs facilitation of private communication with a particular participant during a videoconference according to example embodiments of the present disclosure.

Reference numerals that are repeated across plural figures are intended to identify the same features in various implementations.

DETAILED DESCRIPTION

Virtual conferencing methods such as video conferencing and audio conferencing may provide a richer and more natural venue for remote communication among two or more participants than other available alternatives, such as chatting or email. Businesses or other enterprises with people in different locations may use virtual conferencing to quickly and naturally communicate information with each other. According to aspects of this disclosure, a video communication application provides video conferencing capability among participants at two or more locations. A video communication application may convey video and audio data from each of the participants in a video communication session to each of the other participants. However, although participants meeting in person can engage in clarifying conversations while the meeting is ongoing by whispering to another participant, when participating in teleconferences, participants cannot engage in a clarifying conversation without disrupting the teleconference for other participants.

Generally, the present disclosure is directed to systems and methods for facilitating private voice communication between participants of a teleconference. For example, when a participant in a teleconference requests to privately communicate with another participant, the participants must either disrupt the teleconference to communicate, utilize textual communication, or switch to another telecommunications service (e.g., start a telephone call, etc.). Each of these options presents a number of different inefficiencies. As such, implementations of the present disclosure propose conveyance of private communications between participants while participating in the teleconference. In particular, when a computing system receives an indication that a participant requests to transmit communication data to another participant privately, the computing system can facilitate private communication between the participants by privately transmitting the communication data (e.g., voice data, etc.) from the participant to the other participant during the teleconference session, while other data may be shared publicly at the same time.

The technology of the present disclosure can provide a number of technical effects and benefits. For instance, conventional virtual conferencing techniques do not allow for real-time, private voice communication between participants during a teleconference session. Rather, a participant who requests to communicate with a specific other participant must interrupt an ongoing teleconference session to by addressing all participants to communicate with the other participant. In turn, this extends the length of the virtual conferencing session, causing a substantial increase in usage of computational resources (e.g., bandwidth, memory, storage, power, compute cycles, etc.). However, aspects of the described technology facilitate real-time private communication between specific participants without disrupting the flow of communication between other participants in the teleconference, therefore eliminating the increased usage of computational resources associated with disruption of the teleconference session. Furthermore, aspects of the present disclosure can decrease the quantity of computing resources used by decreasing the likelihood of participants in a teleconference engaging in further communication after the teleconference to clarify any questions that they were unable to ask during the teleconference. Thus, the technology of the present disclosure optimizes teleconferences and the computing resources necessary to maintain a teleconference as well as the time of the individual participants participating in the teleconference.

Furthermore, the present disclosure opens the door to a virtual workplace as opposed to merely virtually working. In particular, the virtual workplace can replicate many desirable attributes of working in person while cutting down on the undesirable attributes. By leveraging the proposed techniques in a virtual workplace, participants can more naturally and seamlessly communicate with others, thus reducing frustration, and optimizing collaboration. As discussed above, by optimizing virtual collaboration, the proposed techniques increase the efficiency of participants by substantially reducing the time required to participate in videoconferencing sessions, thereby reducing the usage of computational resources by the participants (e.g., processor usage, memory usage, network bandwidth, etc.).

With reference now to the Figures, example embodiments of the present disclosure will be discussed in further detail.

Broadcast: As used herein, broadcast or broadcasting refers to any real-time transmission of data (e.g., audio data, video data, AR/VR data, etc.) from a user device and/or from a centralized device that facilitates a teleconference (e.g., a centralized server device, etc.). For example, a broadcast may refer to the direct or indirect transmission of data from a user device to a number of other user devices. It should be noted that, in some implementations, broadcast or broadcasting can include the encoding and/or decoding of transmitted and/or received data. For example, a user device broadcasting video data may encode the video data using a codec. User devices receiving the broadcast may decode the video using the codec.

Participant: As used herein, a participant may refer to any user, group of users, device, and/or group of devices that participate in a live exchange of data (e.g., a teleconference, videoconference, etc.). More specifically, participant may be used throughout the subject specification to refer to either user(s) or user device(s) utilized by the user(s) within the context of a teleconference. For example, a group of participants may refer to a group of users that participate remotely in a videoconference with their own user devices (e.g., smartphones, laptops, wearable devices, teleconferencing devices, broadcasting devices, etc.). For another example, a participant may refer to a group of users utilizing a single computing device for participation in a videoconference (e.g., a videoconferencing device within a meeting room, etc.). For another example, participant may refer to a broadcasting device (e.g., webcam, microphone, etc.) unassociated with a particular user that broadcasts data to participants of a teleconference. For yet another example, participant may refer to a bot or an automated user that participates in a teleconference to provide various services or features for other participants in the teleconference (e.g., recording data from the teleconference, providing virtual assistant services, providing testing services, etc.).

Teleconference: As used herein, a teleconference (e.g., videoconference, audioconference, media conference, Augmented Reality (AR)/Virtual Reality (VR) conference, etc.) is any communication or live exchange of data (e.g., audio data, video data, AR/VR data, etc.) between a number of participants. For example, a teleconference may refer to a videoconference in which multiple participants utilize computing devices to transmit video data and/or audio data to each other in real-time. For another example, a teleconference may refer to an AR/VR conferencing service in which AR/VR data (e.g., pose data, image data, etc.) sufficient to generate a three-dimensional representation of a participant is exchanged amongst participants in real-time. For another example, a teleconference may refer to a conference in which audio signals are exchanged amongst participants over a mobile network. For yet another example, a teleconference may refer to a media conference in which different types or combinations of data are exchanged amongst participants (e.g., audio data, video data, AR/VR data, a combination of audio and video data, etc.).

FIG. 1 depicts a block diagram of an example computing system 100 that performs facilitation of private communication with a particular participant during a videoconference according to example embodiments of the present disclosure. In particular, a computing system can transmit data associated with communication that a first participant requests to keep private to a second, specified participant during a teleconference. For example, the computing system can receive data indicating that the first participant would like to limit communication data to a specific second participant. Stated another way, the computing system can receive input from the first participant that they would like to initiate private communication with a second participant participating in a teleconference including three or more people.

The system 100 includes a participant computing device 102 that is associated with a participant in a teleconference, a teleconferencing computing system 130, and, in some implementations, other participant computing device(s) 150 respectively associated with other participant(s) in the teleconference.

The participant computing device 102 can be any type of computing device, such as, for example, a personal computing device (e.g., laptop or desktop), a mobile computing device (e.g., smartphone or tablet), a gaming console or controller, a wearable computing device (e.g., an virtual/augmented reality device, etc.), an embedded computing device, a broadcasting computing device (e.g., a webcam, etc.), or any other type of computing device.

The participant computing device 102 includes processor(s) 112 and a memory 114. The processor(s) 112 can be any suitable processing device (e.g., a processor core, a microprocessor, an ASIC, an FPGA, a controller, a microcontroller, etc.) and can be one processor or a plurality of processors that are operatively connected. The memory 114 can include non-transitory computer-readable storage media(s), such as RAM, ROM, EEPROM, EPROM, flash memory devices, magnetic disks, etc., and combinations thereof. The memory 114 can store data 116 and instructions 118 which are executed by the processor 112 to cause the participant computing device 102 to perform operations.

The participant computing device 102 can also include participant input components(s) 122 that receives user input. For example, the participant input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example participant input components include a microphone, a traditional keyboard, or other means by which a participant can provide user input.

In some implementations, the participant computing device 102 can include, or can be communicatively coupled, input device(s) 124. For example, the input device(s) 124 may include a camera device configured to capture two-dimensional video data of a user of the participant computing device 102 (e.g., for broadcast, etc.). In some implementations, the input device(s) 124 may include a number of camera devices communicatively coupled to the participant computing device 102 that are configured to capture image data from different poses for generation of three-dimensional representations (e.g., a representation of a user of the participant computing device 102, etc.). In some implementations, the input device(s) 124 may include audio capture devices, such as microphones. In some implementations, the input device(s) 124 may include sensor devices configured to capture sensor data indicative of movements of a user of the participant computing device 102 (e.g., accelerometer(s), Global Positioning Satellite (GPS) sensor(s), gyroscope(s), infrared sensor(s), head tracking sensor(s) such as magnetic capture system(s), an omni-directional treadmill device, sensor(s) configured to track eye movements of the user, etc.).

In some implementations, the participant computing device 102 can include, or be communicatively coupled to, output device(s) 126. Output device(s) 126 can be, or otherwise include, a device configured to output audio data, image data, video data, etc. For example, the output device(s) 126 may include a two-dimensional display device (e.g., a television, projector, smartphone display device, etc.) and a corresponding audio output device (e.g., speakers, headphones, etc.). For another example, the output device(s) 126 may include display devices for an augmented reality device or virtual reality device.

In particular, the participant computing device 102 can include private communication agent 128. Private communication agent 128 can be any sort or combination of software, hardware resource(s), virtualized hardware resource(s), etc. sufficient to facilitate private communication with another participant computing device 150 within a teleconference session. For example, the private communication agent 128 may be a component of a teleconference client application (e.g., stored as instructions 118 and executed using processor(s) 112, etc.) that provides front-end and back-end services for entering, participating in, and leaving a teleconference session (e.g., providing a teleconference user interface, transmitting communication data to a host of the teleconference, receiving and outputting communication data for the user (e.g., via output devices 126), etc.).

For example, the participant computing device 102 may receive interface data associated with input from a participant associated with the participant computing device 102 (e.g., an input that selects element(s) of an interface for a teleconferencing application executed by the participant computing device 102 to facilitate teleconferencing, etc.). The interface data can include a request to limit transmission of communication data to one of the participant computing devices 150 while excluding transmission of the communication data to others of the participant computing devices 150. Communication data can be obtained by the participant computing device 102 from the participant (e.g., via input device(s) 124), and the participant computing device 102 can transmit the communication data to only the participant computing device 150 indicated by the interface data for surfacing of the communication data.

Similarly, the participant computing device 150 may execute another instance of the private communication agent 156. The private communication agent 156 can receive the communication data and cause the communication data to be surfaced for the participant associated with the participant computing device 150 (e.g., cause audio playback of the communication data with an audio output device, display the communication data in an associated display device, etc.).

The teleconferencing computing system 130 includes processor(s) 132 and a memory 134. The processor(s) 132 can be any suitable processing device (e.g., a processor core, a microprocessor, an ASIC, an FPGA, a controller, a microcontroller, etc.) and can be one processor or a plurality of processors that are operatively connected. The memory 134 can include non-transitory computer-readable storage media(s), such as RAM, ROM, EEPROM, EPROM, flash memory devices, magnetic disks, etc., and combinations thereof. The memory 134 can store data 136 and instructions 138 which are executed by the processor 132 to cause the teleconferencing computing system 130 to perform operations.

In some implementations, the teleconferencing computing system 130 includes or is otherwise implemented by server computing device(s). In instances in which the teleconferencing computing system 130 includes plural server computing devices, such server computing devices can operate according to sequential computing architectures, parallel computing architectures, or some combination thereof.

In some implementations, the teleconferencing computing system 130 can receive data of various types from the participant computing device 102 and the participant computing device(s) 150 (e.g., via the network 180, etc.). For example, in some implementations, the participant computing device 102 can capture video data, audio data, multimedia data (e.g., video data and audio data, etc.), sensor data, etc. and transmit the data to the teleconferencing computing system 130. The teleconferencing computing system 130 may receive the data (e.g., via the network 180).

In some implementations, the teleconferencing computing system 130 may receive data from the participant computing device(s) 102 and 150 according to various encryption scheme(s) (e.g., codec(s), lossy compression scheme(s), lossless compression scheme(s), etc.). For example, the participant computing device 102 may encode video data with a video codec, and then transmit the encoded video data to the teleconferencing computing system 130. The teleconferencing computing system 130 may decode the encoded video data with the video codec. In some implementations, the participant computing device 102 may dynamically select between a number of different codecs with varying degrees of loss based on conditions of the network 180, the participant computing device 102, and/or the teleconferencing computing system 130. For example, the participant computing device 102 may dynamically switch from video data transmission according to a lossy encoding scheme to video data transmission according to a lossless encoding scheme based on a signal strength between the participant computing device 102 and the network 180.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some implementations, the teleconferencing computing system 130 may include a teleconference service system 142. The teleconference service system 142 may be configured to facilitate teleconference services for multiple participants. For example, the teleconference service system 142 may receive and broadcast data (e.g., video data, audio data, etc.) between the participant computing device 102 and participant computing device(s) 150. A teleconferencing service can be any type of application or service that receives and broadcasts data from multiple participants. For example, in some implementations, the teleconferencing service may be a videoconferencing service that receives data (e.g., audio data, video data, both audio and video data, etc.) from some participants and broadcasts the data to other participants.

As an example, the teleconference service system can provide a teleconference service to multiple participants. One of the participants can transmit audio and video data to the teleconference service system 142 using a user device (e.g., a participant computing device 102, etc.). A different participant can transmit audio data to the teleconferencing service system 142 with a user device. The teleconference service system 142 can receive the data from the participants and broadcast the data to each user device of the multiple participants.

As another example, the teleconference service system 142 may implement an augmented reality (AR) or virtual reality (VR) conferencing service for multiple participants. One of the participants can transmit AR/VR data sufficient to generate a three-dimensional representation of the participant to the teleconference service system 142 via a device (e.g., video data, audio data, sensor data indicative of a pose and/or movement of a participant, etc.). The teleconference service system 142 can transmit the AR/VR data to devices of the other participants. In such fashion, the teleconference service system 142 can facilitate any type or manner of teleconferencing services to multiple participants.

It should be noted that the teleconference service system 142 may facilitate the flow of data between participants (e.g., participant computing device 102, participant computing device(s) 150, etc.) in any manner that is sufficient to implement the teleconference service. In some implementations, the teleconference service system 142 may be configured to receive data from participants, decode the data, encode the data, broadcast the data to other participants, etc. For example, the teleconference service system 142 may receive encoded video data from the participant computing device 102. The teleconference service system 142 can decode the video data according to a video codec utilized by the participant computing device 102. The teleconference service system 142 can encode the video data with a video codec and broadcast the data to participant computing devices.

Additionally, or alternatively, in some implementations, the teleconference service system 142 can facilitate peer-to-peer teleconferencing services between participants. For example, in some implementations, the teleconference service system 142 may dynamically switch between provision of server-side teleconference services and facilitation of peer-to-peer teleconference services based on various factors (e.g., network load, processing load, requested quality, etc.).

The participant computing device 102 can receive data broadcast from the teleconference service system 142 of teleconferencing computing system 130 as part of a teleconferencing service (video data, audio data, etc.). In some implementations, the participant computing device 102 can upscale or downscale the data (e.g., video data) based on a role associated with the data. For example, the data may be video data may be associated with a participant of the participant computing device 102 that is assigned an active speaker role. The participant computing device 102 can upscale the video data associated with the participant in the active speaker role for display in a high-resolution display region (e.g., a region of the output device(s) 126). For another example, the video data may be associated with a participant with a non-speaker role. The participant computing device 102 can downscale the video data associated with the participant in the non-speaker role using a downscaling algorithm (e.g., lanczos filtering, Spline filtering, bilinear interpolation, bicubic interpolation, etc.) for display in a low-resolution display region. In some implementations, the roles of participants associated with video data can be signaled to computing devices (e.g., participant computing device 102, participant computing device(s) 150, etc.) by the teleconference service system 142 of the teleconferencing computing system 130.

In particular, the teleconference service system 142 can include a private communication handler 144. The private communication handler 144 can be any sort or combination of software, hardware resource(s), virtualized hardware resource(s), etc. sufficient to facilitate private communication between participant computing devices (e.g., 102, 150, etc.) that are participating in a teleconference session hosted using the teleconference service system 144. For example, the participant computing device 102 may receive the interface data as previously described. The participant computing device 102 may then provide data to the teleconference computing system 130 indicating a request to initiate private communications with one of the participant computing devices 150 (e.g., via network(s) 180). Based on the request, the private communication handler 144 can indicate the request to the participant computing device 150. The participant computing device 150 may provide data to the teleconferencing computing system 130 that indicates acceptance to the request to initiate private communications. In response, the private communication handler 144 can provide data to the private communication agent 128 of the participant computing device 102 that instructs the private communication agent 128 to initiate private communications with the participant computing device 150. In such fashion, the private communication handler 144 can facilitate private communication between two participant computing devices participating in a teleconference.

The teleconferencing computing system 130 and the participant computing device 102 can communicate with the participant computing device(s) 150 via the network 180. The participant computing device(s) 150 can be any type of computing device(s), such as, for example, a personal computing device (e.g., laptop or desktop), a mobile computing device (e.g., smartphone or tablet), a gaming console or controller, a wearable computing device (e.g., an virtual/augmented reality device, etc.), an embedded computing device, a broadcasting computing device (e.g., a webcam, etc.), or any other type of computing device.

The participant computing device(s) 150 includes processor(s) 152 and a memory 154 as described with regards to the participant computing device 102. In some implementations, the participant computing device(s) 150 can be substantially similar to, or identical to, the participant computing device 102. Alternatively, in some implementations, the participant computing device(s) 150 may be different devices than the participant computing device 102 that can also facilitate teleconferencing with the teleconference computing system 130. For example, the participant computing device 102 may be a laptop and the participant computing device(s) 150 may be smartphone(s). As described previously, the participant computing device(s) 150 may also execute instances of the private communication agent 156 to facilitate private communications in a teleconference.

In such fashion, systems of the present disclosure can facilitate the private transmission of communication data. For example, the teleconferencing computing system 130 can receive data indicating that participant computing device 102 would like to limit transmission of communication data to one of participant computing device(s) 150 in a teleconference session. The teleconferencing computing system 130 can obtain the communication data (e.g., audio data, video data, etc.) from the participant computing device 102 which can include audio data associated with the participant computing device 102 (e.g., spoken utterance(s) from a participant, background noise from the participant's broadcasting environment, etc.). The teleconferencing computing system 130 can cause transmission of the communication data to the other specific participant so that the communication data is exclusively surfaced on a participant computing device 150 associated with the other specific participant. In other words, the communication data can be surfaced to the participant computing device 150 associated with the specifically indicated participant while not being surfaced to other participant devices 150 associated with other participants of the teleconference session.

One example application of the techniques described herein is for providing communication data such as audio input to only a specified participant of a teleconference during an ongoing teleconference including other participants. As a particular example, the teleconferencing computing system 130 can stop the transmission of communication data from participant computing device 102 to the teleconference and instead redirect the communication data through an alternate route (e.g., an additional private broadcast, etc.) so as to only provide the communication data to the participant computing device 150 (e.g., via the network(s) 180). Furthermore, the communication data associated with the general teleconference can be controlled so as to allow the specified participant to fully interact with the private communication. For example, the audio data associated with the general teleconference can be decreased so that the specified participant can hear the private audio communication data more clearly.

Advantageously, example embodiments according to aspects of the present disclosure can provide for a streamlined method to ask clarifying questions during a teleconference to only a specified participant, much like a whisper. As a particular example, a participant computing device 102 can receive a "long click" input (e.g., via input devices 102) on a specified second participant's icon in a teleconference to initiate a private communication between the two participant computing devices in order to ask a clarifying question without disrupting the flow of the entire teleconference. In particular, this may be a more natural and direct communication path than text, where participants have to change context and communication modality.

Aspects of the present disclosure enable the teleconferencing computing system 130 to use data associated with participant input such as a participant clicking or interacting with another participant's icon/representation in a teleconference to facilitate a private communication between participant computing devices 102 and 150 in a teleconference. As a particular example, based on the teleconferencing computing system 130 determining that a participant is intending to communicate with other participants of the teleconference privately, the teleconferencing computing system 130 can generate a private means of communication for the participants.

Thus, the present disclosure is directed towards a means to facilitate private communication within a teleconferencing session. In particular, the teleconferencing computing system 130 can be used to provide a means for facilitating private communication with participant computing device 102 during a teleconference by controlling where and how communication data is transmitted. More particularly, example aspects of the present disclosure involve a means for facilitating collaboration of teleconference participants in remote locations through real-time interaction by eliminating needless distractions in a teleconference.

In some implementations, the teleconferencing computing system 130 can enable a private communication. In particular, the private communication can be during a audio or video conference, wherein the conference may comprise three or more participating devices. Additionally, or alternatively, the icon may include live-streaming audio data associated with the second participant. Additionally, or alternatively, the icon may include a static image associated with the second participant. Additionally, or alternatively, the icon may include an avatar associated with the second user. Additionally, or alternatively, the icon may be a hardware or software button or key associated with the second user.

It should be noted that the teleconferencing computing system 130 can cause transmission of the communication data in any manner. For example, the teleconferencing computing system 130 may initiate the transmission of communication data to a first network link, otherwise known as a node, out of any number of network links such that the communication data may be transmitted to the second participant device. In particular, the nodes can be arranged in any kind of topology (e.g., hierarchical, star, ring, bus, etc.). The nodes can be included in the network(s) 180. For example, a node may be a virtualized network device utilized by the network(s) 180.

As used herein, surfacing can refer to any means of exposing to a user the communication data. For instance, if the communication data includes textual data, surfacing the textual data can refer to providing an interface for display to a user that includes the textual data associated with the communication data. Alternatively, if the communication data includes audio data, surfacing the audio data can refer to causing playback of the audio data to the user.

In particular, the virtual conferencing parameters may be adjusted prior to causing transmission of the communication data associated with the first participant to the second participant device associated with the second participant for surfacing of the communication data on the second participant device associated with the second participant but not the third participant device(s) participating in the teleconference. For instance, adjusting virtual conferencing parameters can include, but is not limited to, adjusting the volume of the teleconference audio data for the participant device associated with the second participant.

In particular, causing the transmission of the communication data can include causing the transmission of the obtained communication data associated with the first participant in real-time. Stated alternatively, the teleconferencing computing system 130 may cause a live feed of the received communication data associated with the first participant to be transmitted. As a particular example, audio data may be transmitted to the participant computing device 150 associated with the second participant in real-time as the first participant computing device 102 generates it (e.g., by speaking). Alternatively, causing the transmission of communication data can include causing the transmission of a recording of the obtained communication data associated with the first participant. As another particular example, a recording of audio data generated by the participant computing device 102 associated with the first participant can be caused to be transmitted to the participant computing device 150 associated with the second participant after the recording is completed. In particular, there may be a delay in transmission wherein the delay may be predetermined by the teleconferencing computing system 130. Alternatively, the delay in transmission may be determined by the participant computing device 102. As a particular example, the teleconferencing computing system 130 may transmit the recording in response to the participant computing device 102 indicating approval to transmit the recording (e.g., via interaction with a participant interface). For instance, the participant computing device 102 may have the ability to review their recorded message (e.g., auditorily, textually, etc.) prior to approving the transmission to the second participant.

In some implementations, causing the transmission of communication data can include using a private data channel. In particular, the private data channel may be associated with the participant devices associated with the first and second participants. Specifically, the teleconferencing computing system 130 may cause the transmission of communication data over the private data channel such that the communication data may be transmitted directly to the participant computing device 150 associated with the second participant (e.g., through a partner connection). A data channel can refer to a telecommunication link where communication data can be transmitted between computing systems or parts of computing systems. In particular, the data channel can transmit a range of signal frequencies such that the communication data associated with the first participant can be transmitted from a first device to a second device associated with the second participant.

In some implementations, causing the transmission of the communication data can include generating encoded communication data. In particular, the encoded communication data can include the communication data encoded with a key. Even more particularly, the key may be associated with the second participant. Specifically, the teleconferencing computing system 130 may cause the encoded communication data to be transmitted. In particular, the teleconferencing computing system 130 may identify a particular participant device associated with an encoding key (e.g., analyze the key). In some instances, the teleconferencing computing system 130 may decode the communication data. Even more particularly, the teleconferencing computing system 130 may cause transmission of the communication data to the participant computing device 150 based on the key. As a particular example, they key may identify the participant device associated with the second participant, thus, the teleconferencing computing system 130 may cause the server to transmit the communication data to the participant device associated with the second participant based on the key.

In some implementations, causing the transmission of the communication data can include transmitting communication data associated with a first participant device associated with the first participant, the second participant device and the one or more third participant devices participating in the teleconference over a primary track. In particular, causing the transmission of the communication can further include generating an alternate track. In particular, the alternate track can be independent from the primary track. A track can refer to a data channel over which communication data can be transmitted. For example, communication data directed to the general teleconference may be transmitted over a primary track (e.g., primary data channel) while communication data directed towards a private communication may be transmitted over an alternate track (e.g., a separate alternate data channel). Even more particularly, the alternate track may be encrypted. Specifically, the encryption can be associated with the participant device associated with the second participant. Even more specifically, the communication data may be transmitted over the alternate track. Even more specifically, every participant device participating in the teleconference may receive the communication data. In particular, only the participant device associated with the second participant may decode the communication data. Thus, only the participant device associated with the second participant can surface the communication data.

In some implementations, prior to providing the communication data to the participant device associated with the second participant, the teleconferencing computing system 130 may provide notification data to the participant computing device 150 associated with the second participant. In particular, the notification data provided to the participant computing device 150 associated with the second participant may be associated with surfacing a notification. Even more particularly, the notification may be directed to indicate to the second participant that private communication from the first participant has been received. As a particular example, the notification can be surfaced just prior to the private communication from the first participant. In some instances, the notification may be surfaced prior to the first private communication from the first participant but not subsequent communications within the same teleconference. In some instances, the second participant may indicate whether they would prefer to continue receiving notifications prior to the receipt of private communications or not.

In some implementations, the data associated with surfacing a notification may include data directed to a participant input interface associated with the notification. In particular, the participant input interface can include selectable interface element(s). Even more particularly, the selectable interface element(s) may be directed to whether the second participant accepts or rejects the communication data. Specifically, causing the transmission of the notification data to the participant computing device 150 associated with the second participant can include the teleconferencing computing system 130 obtaining response data. Even more specifically, the response data can be associated with data from the participant computing device 150 associated with the second participant, wherein the data is indicative of the second participant accepting the private communication from the first participant. In particular, causing the transmission of the communication data associated with the first participant to the second participant device can include causing in response to receiving the response data, the teleconferencing computing system 130 may cause the transmission of the communication data associated with the first participant to the second participant device associated with the second participant for surfacing of the communication data on the second participant device associated with the second participant but not the third participant device(s) participating in the teleconference.

Figure 2:
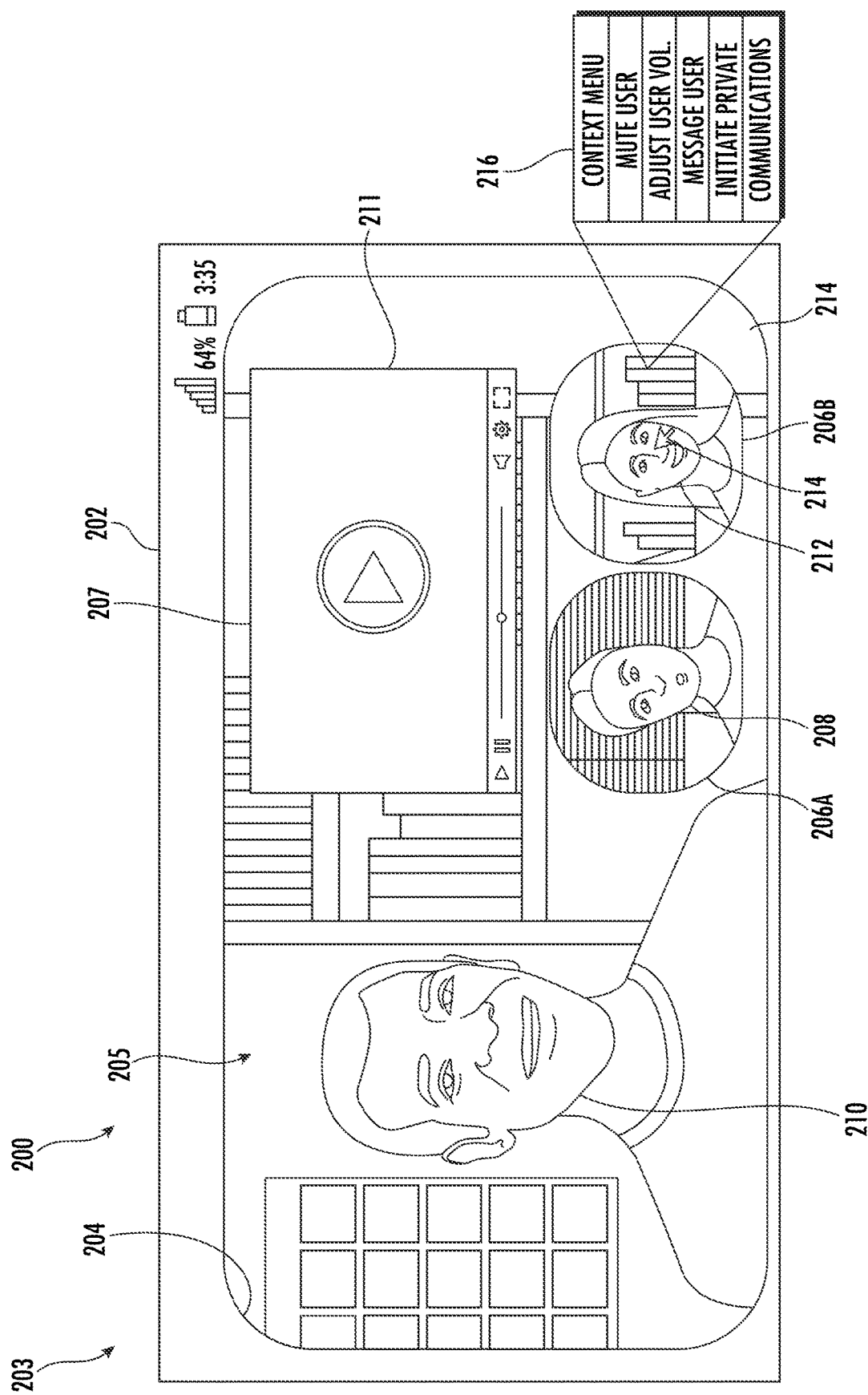
FIG. 2 depicts an example graphical user interface (GUI) of a system that facilitates private communication between participants of a teleconference according to example embodiments of the present disclosure.

FIG. 2 depicts an example graphical user interface (GUI) of a system that facilitates private communication between participants of a teleconference according to example embodiments of the present disclosure. Although the specific example GUI depicts a multi-attendee video conferencing application, any multi-attendee teleconferencing system may be alternately used. As shown at 200, participant device 202 (e.g., a smartphone, tablet, laptop computer, etc.) can display a video stream of a first participant 210 in a primary display region of GUI 205. In some examples, the speaking role of the first participant 210 can be a dominant speaking role, and based on the dominant speaking role of the first participant 210, the participant device 202 can display the video stream of the first participant 210 in primary display 204. A dominant speaking role is a role that can be assigned to any participant that is currently providing audio communication data to the teleconference (e.g., talking to other participants of the conference). Conversely, a passive or non-dominant speaking role is a role that can be assigned to any participant that is not providing audio communication data to the teleconference.

Alternatively, the first participant 210 may occupy the primary display 204 based on the first participant 210 being associated with the particular participant device 202 (e.g., the participant whose participant device it is may be displayed prominently).

Although the primary display 204 is depicted as using the entirety of the display of participant device 202, it should be noted that the primary display 204 does not necessarily need to do so. As an example, the primary display 204 may use 80% of the available display of the participant device 202.

The participant device 202 can display a video stream for a second participant 208 and a video stream for a third participant 212 in video displays 206A and 206B. For example, the speaking roles of second participant 208 and third participant 212 can be non-dominant speaking roles (e.g., the participants that are not currently speaking, etc.). Based on the non-dominant speaking roles of the second participant 208 and the third participant 212, the participant device 202 can display the video streams of the second participant 208 and the third participant 212 respectively in the video displays 206A and 206B. Additionally, or alternatively, it should be noted that the video displays 206A and 206B do not necessarily need to be overlaid on the primary display 204. In some implementations, the video displays 206A and 206B can instead be displayed adjacent to the primary display 204. Additionally, or alternatively, it should be noted that the video displays 206A and 206B do not necessarily need to be smaller in size than the display associated with the dominant speaking role. In some implementations, all video displays can be of equal sizing. Additionally, three video displays are provided by way of example only. A multi-participant videoconference may include any number of displays and associated video streams. Furthermore, a multi-participant videoconference may include a list of attendees in a sidebar.

At 203, GUI 205 is depicted with an interaction display 207 hosting a participant screen sharing presentation 211. For example, the participant screen sharing presentation 211 can show a video player application. As another example, the participant screen sharing presentation 211 can show a slideshow, web browser, document, or any other content a participant share.

At 214, GUI 205 is depicted with a cursor 214. It should be noted that the cursor 214 is depicted as a particular method of input provision merely to illustrate various implementations of the present disclosure. Rather, a cursor, and/or any device necessary to control a cursor, are not required for some implementations of the present disclosure. For example, a participant may provide a touch input to a touchscreen that depicts the GUI 200, therefore providing an input without the use of a cursor element such as cursor 214. For another example, a participant may provide a spoken utterance to the GUI 200 (e.g., to a virtual assistant device associated with the participant computing device or the GUI 200) that requests private communication (e.g., "Hey assistant, start a private chat with participant 2").

In particular, the cursor 214 (or other pointing device) may be controlled by the participant associated with the participant device 202. Even more particularly, the cursor 214 may be moved around the GUI 205 so as to indicate the participant's interest in engaging in private communication with another participant of the videoconference (e.g., the third participant 212). Specifically, the participant may engage their participant device (e.g., click, touch, otherwise depress, etc.) while the cursor 214 is placed on a particular participant of the videoconference (e.g., the third participant 212). For systems that do not support cursors (e.g., touch screens), cursor-placement may not be required. By engaging their participant device, the participant may indicate a request to initiate a private communication with the particular participant of the videoconference (e.g., the third participant 212).

In some implementations, the participant may indicate the request to initiate private communication by moving, clicking, etc. the cursor over a corresponding participants video stream for a certain amount of time. Alternatively, in some implementations, the participant might provide a click input at the location of the cursor (e.g., a right-click input) to open a context menu 216. The context menu 216 can include an interface element indicating the option to initiate private communications with the other participant (e.g., "start private communications". The participant can select the interface element of the context menu 216 with the cursor 214 to provide interface data indicating a request to initiate private communications with the other participant.

Figure 3:
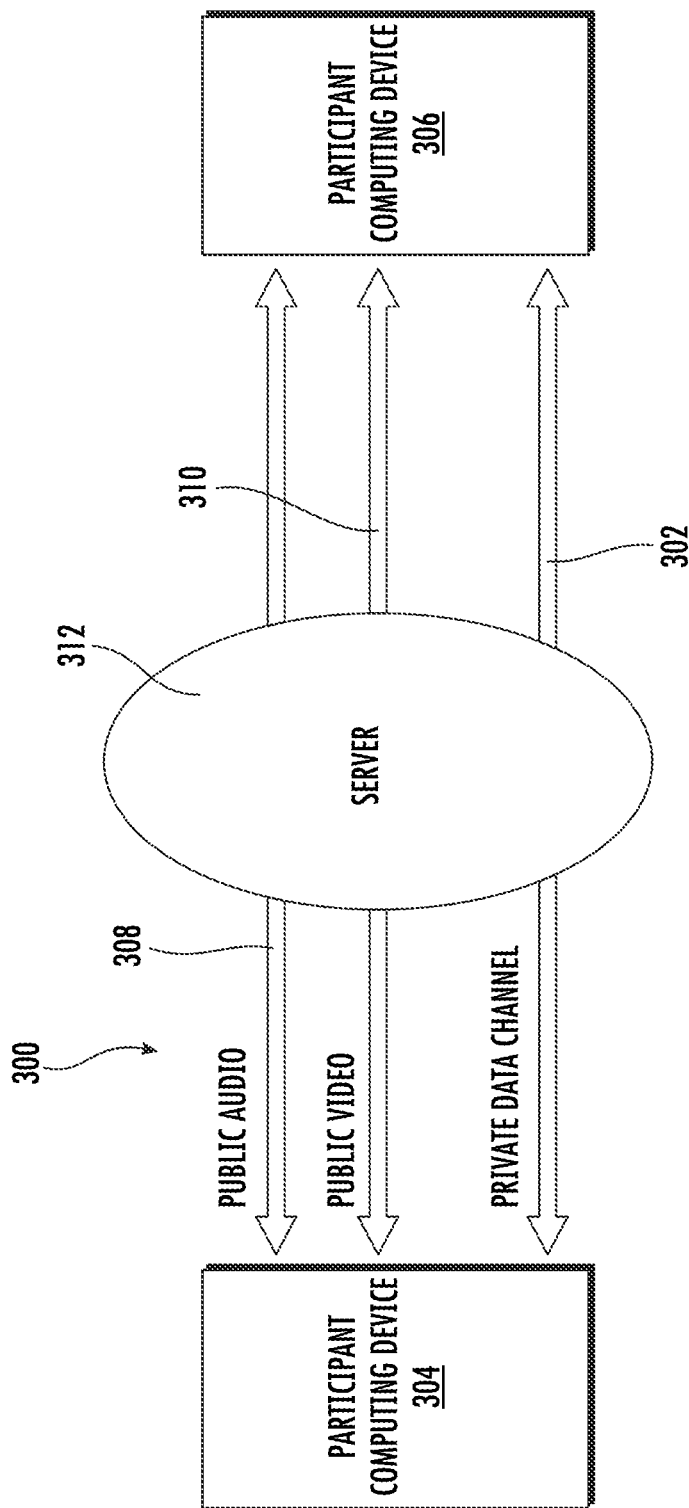
FIG. 3 depicts a data flow diagram illustrating an example method of transmission of communication data between participant computing devices according to example embodiments of the present disclosure.

FIG. 3 depicts a data flow diagram illustrating an example method of transmission of communication data between participant computing devices according to example embodiments of the present disclosure. In particular, private communications can be facilitated between participant computing device 304 (e.g., participant computing device 102 of FIG. 1, etc.) and participant computing device 306 (e.g., participant computing device(s) 150 of FIG. 1, etc.) by a server computing system 312 (e.g., server computing system 130 of FIG. 1, etc.).

As shown at 300, causing the transmission of communication data can include generating a private data channel 302. In particular, the private data channel may be associated with the participant devices associated with the first participant 304 and second participant 306. Specifically, the server computing system 312 may cause the transmission of communication data over the private data channel 302 such that the communication data may be transmitted directly from the participant device 304 to the participant device 306. For example, the participant computing device 304 may utilize peer-to-peer communications to transmit the communication data to the participant device 306 (e.g., direct transmission of data between devices). For example, to generate the private data channel 302, the server computing system 312 may instruct participant device 304 to initiate a data channel for carrying peer-to-peer communications with the participant computing device 306. For another example, to generate the private data channel 302, the server 312 may simply stop broadcast of communication data from participant computing device 304 and participant computing device 306 to other participant computing devices in the teleconference until private communications have stopped (e.g., one or both participant devices have provided a request to cease private communications, etc.). For yet another example, the participant computing device 304 may provide a request to initiate peer-to-peer communications to the participant computing device 306 directly without communicating with the server computing device 312.

The ongoing teleconference may have data channels associated with the teleconference such as a public audio channel 308, public video data channel 310, a public messaging channel, and private data channel 302. The public audio data channel 308 and public video data channel can be channels that carry communication data (e.g., audio and video data) between each participant computing device of the teleconference. In particular, a "public" data channel can be considered a default channel that broadcasts non-private communication data to each participant. For example, five participant computing devices can provide five separate video streams carrying video data to the server computing system 12. The server computing system 12 can collectively broadcast all of the five separate video streams to each of the five participants via the public video channel 310

Conversely, the private data channel 302 can be a channel that specifically carries private communication data between the participant computing devices 304 and 306.

In particular, the server computing system 312 may temporarily halt data transmission from the participant computing device 304 to the public audio channel 308 and the public video data channel 310 while data is being transmitted through the private data channel 302. For example, the server computing system 312 may determine to cease the broadcast of communication data from participant computing devices 304 and 306 to other participant computing devices until the private data channel 302 has been closed.

In some implementations, the private data channel 302 may be closed when one, or both, participant computing devices 304 and/or 306 provide data indicative of a request to cease private communications. Additionally, or alternatively, in some implementations, the server computing system 312 may automatically close the private data channel 302 if neither participant computing devices transmit communication data for a period of time.

It should be noted that the public audio channel 308 and the public video data channel 310 may continue to carry communication data from other public audio channel 308 and the public video data channel 310 participants in the teleconference who are not the first participant 304. Even more particularly, the public audio channel 308 and the public video data channel 310 and private data channel 302 may each be facilitated by the server computing system 312.

In some implementations, the server computing system 312 may transmit the data associated with the public audio data channel 308 and the public video data channel 310 and private data channel 302 to other participants associated with the teleconference or to the particular second participant 306. For example, while providing public audio data channel 308 and public video data channel 310 to each participant computing device in the teleconference, the server computing system 312 may receive private communication data from the participant computing device 312 (e.g., via private data channel 302) and then broadcast the private communication data to the participant computing device 306 (e.g., indirect communication between the devices).

Alternatively, once the private data channel 302 is established between the first participant 304 and the second participant 306, the server computing system 312 may instruct the participant communication devices 312 to transmit communication data directly to each other in a peer-to-peer manner. For example, the server computing system 312 may instruct the participant computing device 401 to create a "stream" object (e.g., a media track, etc.) that serves as the private data channel between the participant computing devices.

Figure 4:
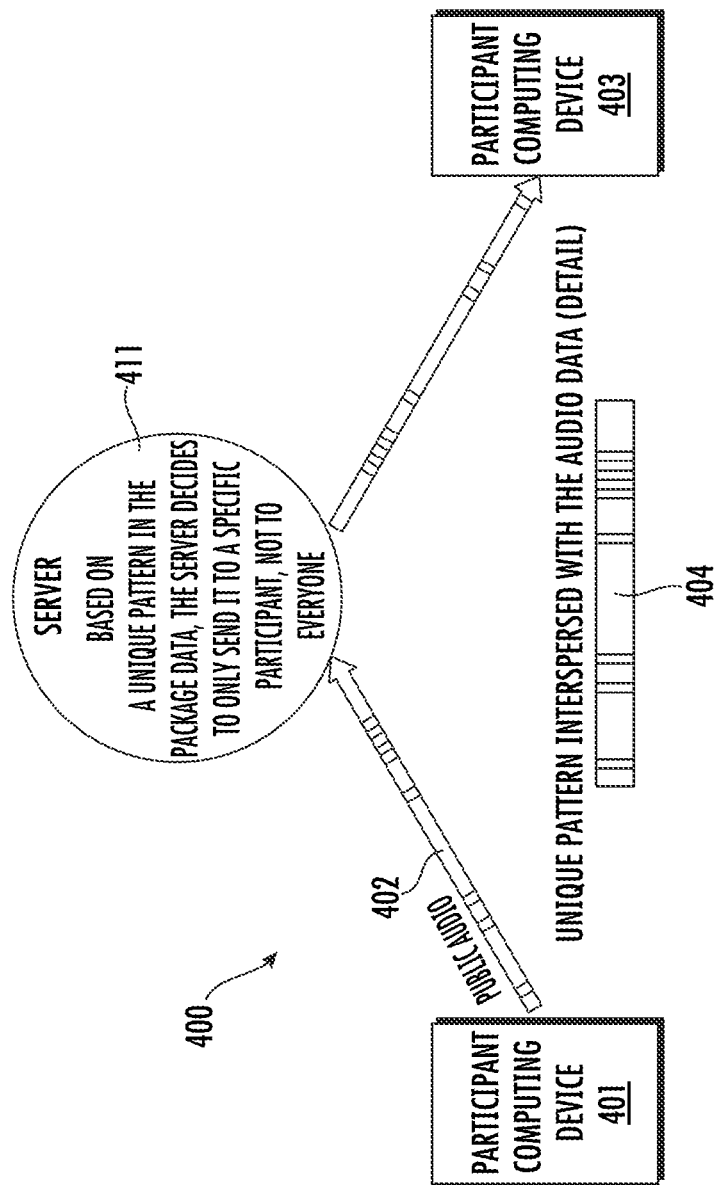
FIG. 4 depicts a diagram illustrating another example method of transmission of communication data according to example embodiments of the present disclosure.

FIG. 4 depicts a diagram illustrating another example method of transmission of communication data according to example embodiments of the present disclosure. As shown at 400, in addition to establishing a private data channel (e.g., the private data channel 302 of FIG. 3), causing the transmission of communication data can also include encoding communication data (e.g., via application of one or more encoding schemes) to generate encoded communication data 402. In other words, a private data channel (e.g., private data channel 302 of FIG. 3) can carry encoded communication data.

For example, a server computing system 411 may instruct a participant computing device 401 to apply a particular encoding scheme to communication data to generate encoded communication data 402 before transmission via a private data channel to participant computing device 403. The server computing system 411 may also inform participant computing device 403 of the encoding scheme used so that the participant computing device 403 can decode the encoded communication data 402.

In some implementations, the encoded communication data 402 can be encoded with a key 404. The key may be based on various aspects of the participant computing devices 401 and/or 403. For instance, the key 404 may be directed to a unique pattern associated with the participant computing device 403 (e.g., the name of a participant associated with the participant computing device 403, etc.). As a particular example, the unique pattern may be generated by using a name or ID of a participant associated with the participant computing device 403 and creating a hash function.

In some implementations, the server computing system 411 may cause the encoded communication data 402 to be transmitted from the participant computing device 401 to the participant computing device 403. For example, the key 404 may identify the participant computing device 403 (e.g., a hash value generated based on the participant associated with the participant computing device 403, etc.). The server computing system 411 can determine that the participant computing device 403 is the intended recipient of the encoded communication data 402 by analyzing the key. In some implementations, to do so, the server computing system 411 may decode the encoded communication data 402. In some implementations, the key 404 may be dispersed throughout the encoded communication data 402. For example, as depicted, the key 404 may be dispersed randomly throughout the encoded communication data 402. Alternatively, in some implementations, although not depicted, the key 404 may be inserted in a particular position (e.g., a header, a footer, etc.).

FIG. 5 depicts a flow chart diagram of an example method to perform according to example embodiments of the present disclosure. Although FIG. 5 depicts operations performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At operation 502, a computing system comprising processor(s) may receive interface data. In particular, the interface data may be associated with input from a first participant to a first participant device associated with the first participant and participating in the teleconference. Even more particularly, the interface data can be indicative of limiting communication data to a particular participant device. Specifically, the particular participant device may be associated with the second participant. Even more specifically, the interface data may include a request to limit transmission of communication data to a second participant device associated with a second participant and participating in the teleconference while excluding transmission of the communication data to third participant device(s) participating in the teleconference. As a particular example, the interface data can include data responsive to the first participant interacting with an icon surfaced in the teleconference (e.g., touching, clicking, etc.) Even more particularly, the icon may be associated with the second participant. For instance, the icon may be a part of the teleconference interface, surfacing the second participant as a participant in the ongoing teleconference. In particular, the icon may include live-streaming video data associated with the second participant. Additionally, or alternatively, the icon may include live-streaming audio data associated with the second participant. Additionally, or alternatively, the icon may include a static image associated with the second participant. Furthermore, the first participant can indicate ending a private communication by further interacting with the icon surfaced in the teleconference or by the lack of interaction with the icon (e.g., letting go of a long click, moving the cursor off the icon, etc.).

At operation 504, the computing system can obtain communication data. In particular, the communication data can be associated with the first participant. Even more particularly, the communication data can include audio data associated with the first participant. Furthermore, the communication data can include textual data associated with the first participant (e.g., a textual message, files, etc.). Even further, the communication data can include image data associated with the first participant. Specifically, when the computing device is receiving communication data associated with a private communication, the participant device associated with the first participant may halt transmission of communication data to the teleconference. As a particular example, if the first participant is generating private communication audio data, the participant device associated with the first participant may halt transmission of audio data. Specifically, the participant device associated with the first participant may halt transmission of audio data while the first participant is generating private communication audio data and resume transmission of audio data after the first participant has finished generating private communication audio data.

At operation 506, the computing system can cause transmission of the communication data. In particular, the transmission of the communication data can be associated with the first participant to the second participant device associated with the second participant for surfacing of the communication data on the second participant device associated with the second participant. Specifically, the communication data may not be transmitted to the third participant device(s) participating in the teleconference. As a particular example, the audio data associated with the first participant may be surfaced to the second participant such that the second participant can listen to it. Furthermore, in some cases, the computing system may cause the transmission of teleconference parameter data. In particular, the virtual conferencing parameter data may be directed to adjusting virtual conferencing parameters in order to facilitate the communication between the first and second participant. In particular, the virtual conferencing parameters may be adjusted prior to causing transmission of the communication data associated with the first participant to the second participant device associated with the second participant for surfacing of the communication data on the second participant device associated with the second participant but not the third participant device(s) participating in the teleconference. For instance, adjusting virtual conferencing parameters can include, but is not limited to, adjusting the volume of the teleconference audio data for the participant device associated with the second participant. As a particular example, lowering the volume of the teleconference audio data for the participant device associated with the second participant may make it easier for the second participant to listen to the audio data associated with the private communication from the first participant.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for enabling private communications during a videoconference comprising three or more participating devices, the method comprising:

receiving, by a computing system comprising one or more processors, interface data associated with input from a first participant to a first participant device associated with the first participant and participating in the videoconference, wherein the interface data comprises a request to limit transmission of communication data to a second participant device associated with a second participant and participating in the videoconference while excluding transmission of the communication data to one or more third participant devices participating in the videoconference;

obtaining, by the computing system, the communication data associated with the first participant, wherein the communication data comprises audio data associated with the first participant; and causing, by the computing system, transmission of a recording of the communication data associated with the first participant to the second participant device for surfacing of the communication data on the second participant device but not the one or more third participant devices participating in the videoconference.

2. The computer-implemented method of claim 1, further comprising, prior to causing transmission of the recording of the communication data associated with the first participant to the second participant device:

causing, by the computing system, transmission of notification data to the participant device associated with the second participant, wherein the notification data is associated with surfacing a notification, wherein the notification is directed to indicate to the second participant that private communication from the first participant has been obtained.

3. The computer-implemented method of claim 2, wherein:
the notification data comprises data directed to a participant input interface comprising selectable interface elements directed to whether the second participant accepts or rejects the communication data; and
wherein causing the transmission of the notification data to the participant device associated with the second participant further comprises:
obtaining, by the computing system, response data associated with data from the participant device associated with the second participant, wherein the response data is indicative of the second participant accepting the private communication from the first participant; and
wherein causing the transmission of the recording of the communication data associated with the first participant to the second participant device comprises causing, by the computing system in response to obtaining the response data, transmission of the recording of the communication data associated with the first participant to the second participant device for surfacing of the communication data on the second participant device but not the third participant devices participating in the videoconference.

4. The computer-implemented method of claim 1, further comprising, prior to causing the transmission of the recording of the communication data associated with the first participant to the second participant device associated with the second participant:
causing, by the computing system, transmission of videoconference parameter data, wherein the videoconference parameter data is directed to adjusting a volume of the audio of the videoconference.

5. The computer-implemented method of claim 1, wherein the interface data comprises data responsive to the first participant touching or clicking on an icon surfaced in the videoconference, wherein the icon is associated with the second participant.

6. The computer-implemented method of claim 1, wherein causing the transmission of the recording of the communication data associated with the first participant to the second participant device associated with the second participant comprises causing, by the computing system, the transmission of the recording of the communication data associated with the first participant to the second participant device in real-time for surfacing of the communication data on the second participant device but not the one or more third participant devices participating in the videoconference.

7. The computer-implemented method of claim 1, wherein causing the transmission of the recording of the communication data associated with the first participant to the second participant device comprises:
generating, by the computing system, a private data channel, wherein the private data channel is associated with the participant devices associated with the first and second participant; and
causing, by the computing system, the transmission of the recording of the communication data over the private data channel such that the recording of the communication data is transmitted directly to the participant device associated with the second participant over the private data channel.

8. The computer-implemented method of claim 1, wherein causing the transmission of the recording of the communication data associated with the first participant to the second participant device comprises:
generating, by the computing system, an encoded recording of the communication data, wherein the encoded recording of the communication data comprises the recording of the communication data encoded with a key, wherein the key is associated with the second participant;
causing, by the computing system, the transmission of the encoded recording of the communication data to a server;
causing, by the computing system the server to determine the second participant associated with the key; and
causing, by the computing system, the transmission of the recording of the communication data to the second participant device.

9. The computer-implemented method of claim 1, wherein causing the transmission of the recording of the communication data associated with the first participant to the second participant device comprises:
transmitting, by the computing system, communication data associated with a first participant device associated with the first participant, the second participant device and the one or more third participant devices participating in the videoconference over a primary track;
generating, by the computing system, an alternate track, wherein the alternate track is independent from the primary track; and
transmitting, by the computing system, the recording of the communication data over the alternate track, wherein every participant device participating in the videoconference receives the communication data associated with the first participant device, the second participant device, and the one or more third participant devices, but only the participant device associated with the second participant can decode the recording of the communication data.

10. A computing system, comprising:
one or more processors; and
one or more non-transitory, computer-readable media that store instructions that when executed by the one or more processors cause the computing system to perform operations, the operations comprising:
receiving interface data associated with input from a first participant to a first participant device associated with the first participant and participating in a videoconference, wherein the interface data comprises a request to limit transmission of communication data to a second participant device associated with a second participant and participating in the videoconference while excluding transmission of the communication data to one or more third participant devices participating in the videoconference;
obtaining communication data associated with the first participant, wherein the communication data comprises audio data associated with the first participant; and
causing transmission of a recording of the communication data associated with the first participant to the second participant device associated with the second participant for surfacing of the recording of the communication data on the second participant device associated with the second participant but not the one or more third participant devices participating in the videoconference.

11. The computing system of claim 10, further comprising, prior to causing the transmission of the recording of the communication data associated with the first participant to the second participant device:
  causing transmission of notification data to the participant device associated with the second participant, wherein the notification data is associated with surfacing a notification, wherein the notification is directed to indicate to the second participant that private communication from the first participant has been obtained.

12. The computing system of claim 11, wherein:
the notification data comprises data directed to a participant input interface comprising selectable interface elements directed to whether the second participant accepts or rejects the communication data; and
wherein causing the transmission of the notification data to the participant device associated with the second participant further comprises:
  obtaining response data associated with data from the participant device associated with the second participant, wherein the response data is indicative of the second participant accepting the private communication from the first participant; and
wherein causing the transmission of the recording of the communication data associated with the first participant to the second participant device comprises causing, in response to obtaining the response data, transmission of the recording of the communication data associated with the first participant to the second participant device for surfacing of the communication data on the second participant device but not the third participant devices participating in the videoconference.

13. The computing system of claim 10, further comprising, prior to causing transmission of the recording of the communication data associated with the first participant to the second participant device associated with the second participant:
  causing transmission of videoconference parameter data, wherein the videoconference parameter data is directed to adjusting a volume of audio of the videoconference.

14. One or more non-transitory computer-readable media that store instructions that, when executed by one or more processors of a computing system, cause the computing system to perform operations comprising:
  receiving interface data associated with input from a first participant to a first participant device associated with the first participant and participating in a videoconference, wherein the interface data comprises a request to limit transmission of communication data to a second participant device associated with a second participant and participating in the videoconference while excluding transmission of the communication data to one or more third participant devices participating in the videoconference, and wherein the interface data comprises data responsive to the first participant touching or clicking on an icon surfaced in the videoconference wherein the icon is associated with the second participant;
  obtaining the communication data associated with the first participant, wherein the communication data comprises audio data associated with the first participant;
  causing transmission of notification data to the participant device associated with the second participant, wherein the notification data is associated with surfacing a notification, wherein the notification is directed to indicate to the second participant that private communication from the first participant has been obtained and wherein the notification data comprises data directed to a participant input interface comprising selectable interface elements directed to whether the second participant accepts or rejects the communication data;
  causing transmission of videoconference parameter data wherein the videoconference parameter data is directed to adjusting a volume of audio of the videoconference; and
  wherein causing the transmission of the notification data to the participant device associated with the second participant further comprises:
    obtaining response data associated with data from the participant device associated with the second participant, wherein the response data is indicative of the second participant accepting the private communication from the first participant; and
  in response to obtaining the response data, causing transmission of a recording of the communication data associated with the first participant to the second participant device for surfacing of the recording of the communication data on the second participant device but not the one or more third participant devices participating in the videoconference.

15. The one or more non-transitory computer-readable media of claim 14, wherein causing the transmission of the recording of the communication data associated with the first participant to the second participant device associated with the second participant comprises:
  causing the transmission of the recording of the communication data associated with the first participant to the second participant device in real-time for surfacing of the recording of the communication data on the second participant device but not the one or more third participant devices participating in the videoconference.

16. The one or more non-transitory computer-readable media of claim 14, wherein causing the transmission of the recording of the communication data associated with the first participant to the second participant device comprises:
  generating a private data channel, wherein the private data channel is associated with the participant devices associated with the first and second participant; and
  causing transmission of recording of the communication data over the private data channel such that the recording of the communication data is transmitted directly to the participant device associated with the second participant over the private data channel.

17. The one or more non-transitory computer-readable media of claim 14, wherein causing the transmission of the recording of the communication data associated with the first participant to the second participant device comprises:
  generating encoded communication data, wherein the encoded communication data comprises the recording of the communication data encoded with a key, wherein the key is associated with the second participant;
  causing the transmission of the encoded communication data to a server;
  causing the server to determine the second participant associated with the key; and
  causing the transmission of the recording of the communication data to the second participant device.

18. The one or more non-transitory computer-readable media of claim 14, wherein causing the transmission of the recording of the communication data associated with the first participant to the second participant device comprises:
  transmitting communication data associated with a first participant device associated with the first participant, the second participant device and the one or more third participant devices participating in the videoconference over a primary track;

generating an alternate track, wherein the alternate track is independent from the primary track; and transmitting the recording of the communication data over the alternate track, wherein every participant device participating in the videoconference receives the communication data associated with the first participant device, the second participant device, and the one or more third participant devices, but only the participant device associated with the second participant can decode the recording of the communication data.

\* \* \* \* \*